(12) United States Patent  
Schindler

(10) Patent No.: US 7,581,422 B2  
(45) Date of Patent: Sep. 1, 2009

(54) DEVICE FOR STARTING A VEHICLE ENGINE BY MEANS OF AN ELECTRONIC KEY, AND KEY TO BE USED THEREFOR

(75) Inventor: Mirko Schindler, Velbert (DE)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 334 days.

(21) Appl. No.: 11/587,322

(22) PCT Filed: Apr. 18, 2005

(86) PCT No.: PCT/EP2005/004098

§ 371 (c)(1),  
(2), (4) Date: Oct. 19, 2006

(87) PCT Pub. No.: WO2005/102798

PCT Pub. Date: Nov. 3, 2005

(65) Prior Publication Data

US 2007/0247300 A1    Oct. 25, 2007

(30) Foreign Application Priority Data

Apr. 21, 2004  (DE) .................. 10 2004 019 919

(51) Int. Cl.  
*B60R 25/02* (2006.01)

(52) U.S. Cl. .................... 70/252; 70/389; 70/278.1

(58) Field of Classification Search ............ 70/252, 70/389, 278.1, 278.2, 278.7, 408, 409  
See application file for complete search history.

(56) References Cited

U.S. PATENT DOCUMENTS 3,575,024 A * 4/1971 Shlage ................... 70/389  
3,708,032 A * 1/1973 Suzuki ................... 180/287  
3,851,505 A * 12/1974 Wilkinson ................ 70/255  
4,120,184 A * 10/1978 Gerlach ................... 70/389  
4,601,184 A * 7/1986 Doinel ................... 70/360

(Continued)

FOREIGN PATENT DOCUMENTS

EP        1 193 146 A1      3/2002

(Continued)

OTHER PUBLICATIONS

International Search Report dated Jul. 6, 2005.

*Primary Examiner*—Suzanne D Barrett  
(74) *Attorney, Agent, or Firm*—Quarles & Brady LLP

(57) ABSTRACT

The invention relates to a mechanism (1) for starting a vehicle engine by means of an electronic key (3). Said mechanism (1) comprises a receiving device (2) in the vehicle for inserting the key (3). The key (3) that is inserted in said receiving device (2) cannot be twisted while being movable in a longitudinal direction into at least one defined raised position. Such mechanisms are provided with locking devices which secure the electronic key (3) in the receiving slot against being removed during operation of the vehicle. Said locking device is controlled via electrical drives (10). In order to be able to remove the key (3) when the drive (10) is down or in case of a power failure in the vehicle, means are that provided that allow the key (3) to be removed mechanically as an emergency measure.

12 Claims, 3 Drawing Sheets

U.S. PATENT DOCUMENTS

Figure 1:
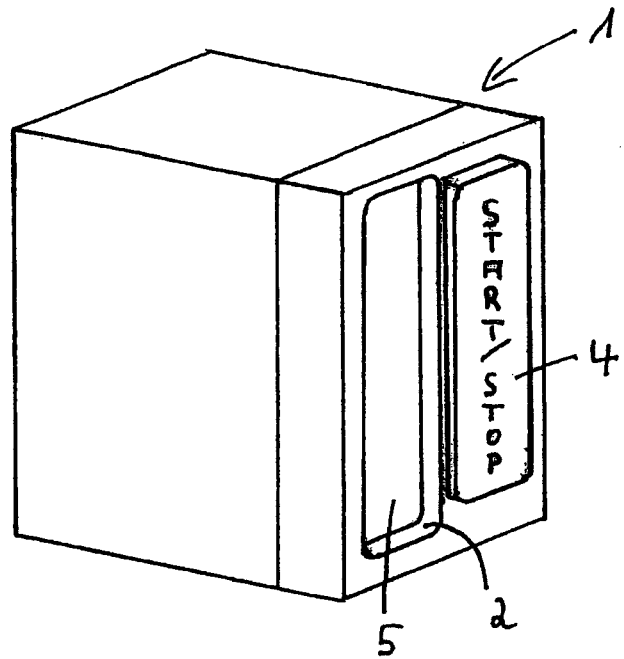

| | | | |
|---|---|---|---|
| 4,858,453 A * | 8/1989 | Namazue | 70/278.3 |
| 5,254,996 A * | 10/1993 | Claar et al. | 341/176 |
| 5,801,614 A * | 9/1998 | Kokubu | 340/425.5 |
| 6,169,650 B1 * | 1/2001 | Albrecht | 361/171 |
| 6,260,651 B1 * | 7/2001 | Kokubu et al. | 180/287 |
| 6,351,206 B1 * | 2/2002 | Schweiger et al. | 340/5.64 |
| 6,370,929 B1 * | 4/2002 | Watanabe et al. | 70/423 |
| 6,442,985 B1 * | 9/2002 | Watanuki et al. | 70/186 |
| 6,460,386 B1 | 10/2002 | Watanuki et al. | |
| 6,513,357 B2 * | 2/2003 | McCurry | 70/389 |
| 6,539,762 B1 * | 4/2003 | Wittwer | 70/423 |
| 6,546,768 B1 * | 4/2003 | Burghoff et al. | 70/252 |
| 6,776,016 B1 | 8/2004 | Wittwer et al. | |
| 6,803,675 B2 * | 10/2004 | Harada et al. | 307/10.3 |
| 6,982,632 B2 * | 1/2006 | Nagasaka et al. | 340/426.3 |
| 6,986,272 B2 * | 1/2006 | Sandvoss et al. | 70/409 |
| 7,187,266 B2 * | 3/2007 | Hasegawa et al. | 340/5.62 |
| 7,302,817 B2 * | 12/2007 | Ohtaki et al. | 70/186 |
| 7,334,441 B1 * | 2/2008 | Amundson et al. | 70/252 |
| 7,392,675 B2 * | 7/2008 | Kito | 70/252 |
| 2005/0034493 A1 * | 2/2005 | Wittwer et al. | 70/186 |
| 2006/0053848 A1 * | 3/2006 | Ghabra et al. | 70/252 |
| 2006/0139146 A1 * | 6/2006 | Ito et al. | 340/5.31 |
| 2008/0100418 A1 * | 5/2008 | Stobbe et al. | 340/5.73 |

FOREIGN PATENT DOCUMENTS

| | | |
|---|---|---|
| EP | 1 279 576 A2 | 1/2003 |
| WO | WO 99/21741 | 5/1999 |

* cited by examiner

DEVICE FOR STARTING A VEHICLE ENGINE BY MEANS OF AN ELECTRONIC KEY, AND KEY TO BE USED THEREFOR

The invention relates to a device for starting a vehicle engine by means of an electric key, comprising a receiving device in the vehicle for insertion of the key, with the key, when inserted in the receiving device, being unable to be rotated and being moveable in a longitudinal direction into at least one defined raised position, with the raised position of the key being monitored by sensors of a control unit and being used to control various functions of the engine, and the key, when in a specific raised position, being secured against removal from the receiving device by locking elements controlled by an electric drive. The invention also relates to an electronic key for use in such a receiving device.

A device of this kind is known from DE 199 39 733 A1, in which the electronic key is blocked against removal by a mechanism and an associated solenoid in the device.

In the blocked position, the engine can be started or switched off by means of a start/stop button. In this context, the key is recessed as far as possible into the receiving device. The key is shifted to a raised position by tilting it, thus enabling it to be removed by hand. This is, however, possible only if the magnetic lock enables the lifting movement.

A similar disclosure is known from DE 197 47 732 C2, in which unauthorized removal of the key is prevented by means of an electromagnetic lock.

EP 1 279 576 A2 discloses a key receiving device, whose locking pin is guided in a heart-shaped locking cam. When the key is inserted to the limit position, the pin is slid into the enable track, and the key receiving device can then slide to the removal position. To prevent unauthorized removal of the key, a rotary catch moved by an electromagnetic drive blocks the locking cam, thus preventing the moveable key receiving device from reaching the removal position.

WO 2004/087470 A1 also discloses a receiving device for an electronic key, with it being possible for the key to take up various positions in the receiving slot in order to trigger various control functions. Said key is also blocked against unauthorized removal by an electric control unit and corresponding mechanical lock. The control unit enables the key to be removed only when it is at a defined position in the slot.

FR 2 814 417 A1 presents a receiving device in a check card format with said key being blocked in one position and secured against removal by means of a rotary lever. Removal of the card is enabled by means of a button. To prevent removal when driving, the rotary lever is prevented from performing a release movement either by an electromagnetic actuating element or an actuating element driven by an electric motor.

The disadvantage with all these arrangements is that if the solenoid fails or a total power failure occurs in the vehicle, the electromagnetic locks or electric locking drives do not release the lock and the key can thus not be removed.

The object of the invention is therefore to enable an electronic key to be removed if the unlocking drive is defective or no longer functions due to lack of electric power in the vehicle.

This object is achieved by the features given in patent claim 1.

The device is characterized in that the device has means that enable the electronic key to be removed in the event of failure of the electric drive.

The electric drive itself or the lever operated by the electric drive that actuates the lock can be moved to its unlocking position by these means.

It is advantageously provided that the locking element actuated by an electric drive has a lever and/or actuating surfaces on which an actuating element moving in a recess in the electronic key acts when actuated in an emergency, so that the locking element can be manually moved to an unlocking position by means of this element.

Because a recess in the electronic key is used to guide through an actuating element, the need for a costly device outside the device is dispensed with.

It is advantageously provided that a start/stop button forms a unit with the receiving device for the electronic key.

It is advantageously provided that the electric drive for activating/deactivating the key locking element is a solenoid.

Alternatively, the electric drive can be advantageously embodied as an electric motor.

It is advantageously provided that the electronic key inserted into the receiving device can be moved in a longitudinal direction between at least two axially offset raised positions, with the different raised positions of the key being monitored by sensors of a control unit and being used to control various functions of the engine or of the vehicle.

As a result, various control functions can be controlled by actuation of the electronic key, such as starting the engine itself or switching on other consumer units such as the radio.

It is preferably provided that the actuating element for emergency actuation is a wire-shaped part. Any simple part, such as one made from a single piece of wire or paper clip in an emergency, would be available to activate the emergency mechanism.

Preferably it is provided that an electronic key is provided for use in this mechanism, with the key having a continuous recess in the direction of insertion to allow the passage of, or to hold, an actuating element.

A further advantageous embodiment of the invention is distinguished in that the recess in the electronic key leads in funnel-shape into a bore so that the wire-shaped actuating element to be passed through can be passed centrally through the bore in order to move the locking element to the unlocking position.

In this way any wire can be inserted into the mechanism and is then automatically guided to the element to be actuated within the device.

In a further advantageous embodiment, the receiving slot of the emergency key in the electronic key is used as a recess for realizing the guiding through element. This simplifies construction of the electronic key, which is very important particularly for mass production.

In an alternative embodiment it is provided that a pin, is supported in the recess, spring loaded counter to the direction of insertion of the electronic key, wherein in the unactuated position it does not project beyond the insertion side of the key housing and when actuated from the insertion side of the emergency key it projects from the opposite surface of the key housing and moves the locking element to an unlocking position.

The actuating element is thus always carried with the key and simplifies operation in an emergency.

Preferably it is provided that the recess or actuating pin is covered by the grip of the emergency key in the normal position and the emergency key has to be removed from the electronic key for actuation. This necessary recess therefore does not appear intrusive when viewed externally.

The recess for guiding through the actuating element is preferably normally provided with a cover on the surface opposite the insertion surface. The recess is thus also protected against the ingress of dirt during use.

By means of the preferred embodiments of the invention, an inexpensive method of removing an electronic key in an emergency can be realized. There is no need for a separate switching element with its mechanism in the area of the instrument panel and no special installation expense is required, which substantially affects costs, particularly in the mass production of motor vehicles. The operating surfaces can be of inconspicuous design because any existing recesses are provided with their own covers.

Because the emergency unlocking has to be carried out independently using a separate tool, inadvertent actuations and associated incorrect operations are avoided.

Two examples of embodiments of the invention are shown schematically in the drawings.

The drawings are as follows.

FIG. 1: A perspective view of such a device as a unit

Figure 2:
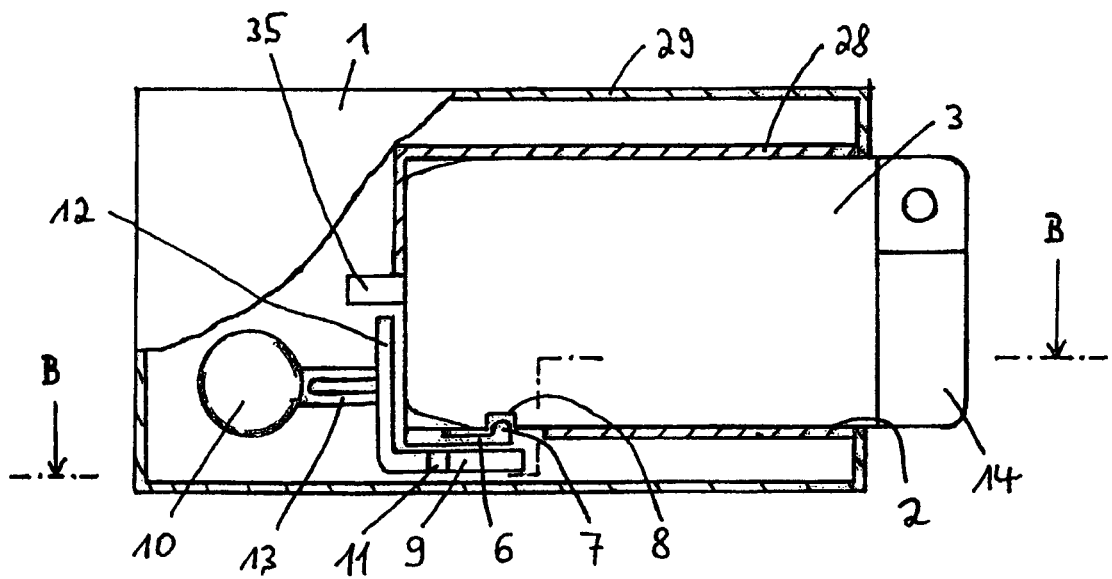

FIG. 2: A sectional view, A-A, through a device for starting a vehicle engine

Figure 3:
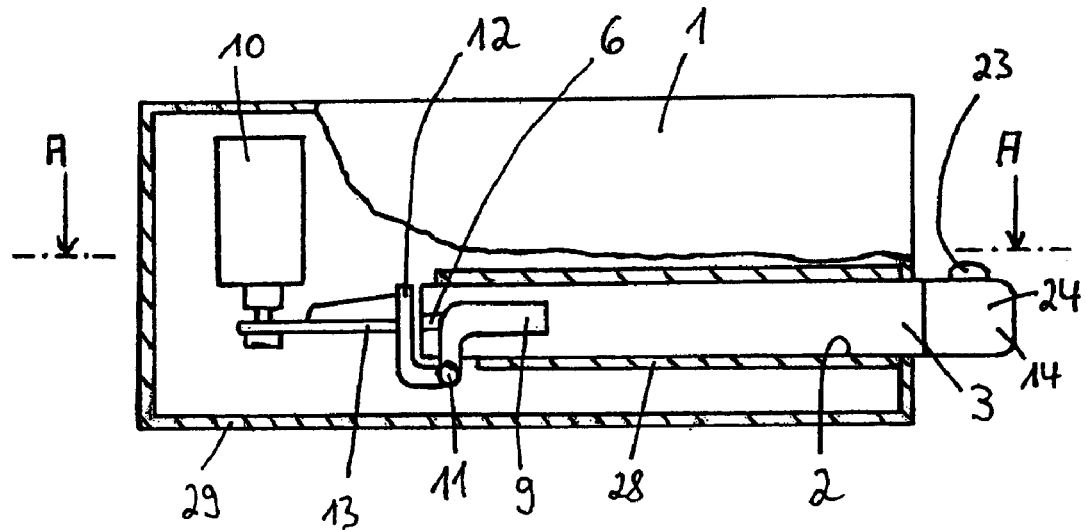

FIG. 3: A side view showing a partial section along B-B in the locked position

Figure 4:
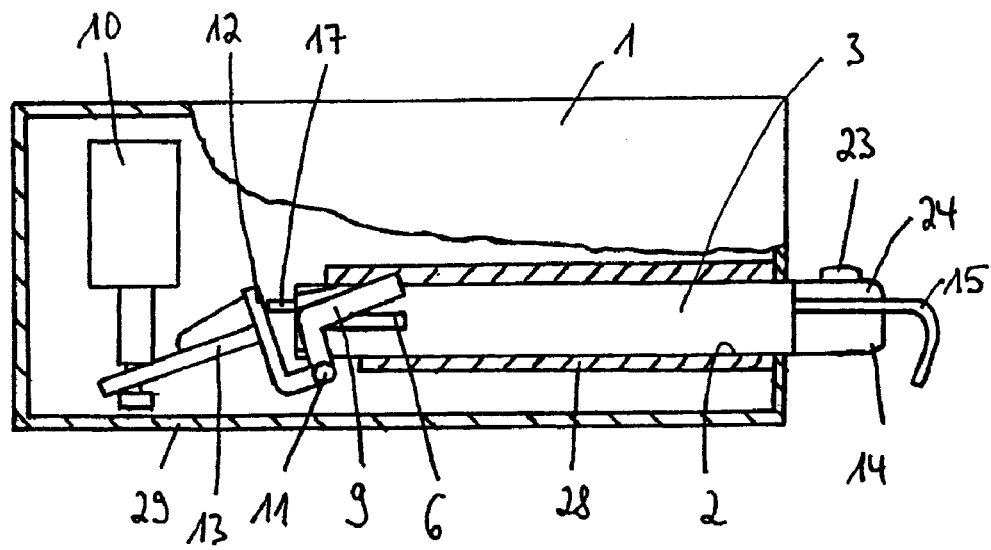

FIG. 4: A side view showing a partial section along B-B in the unlocked position FIG. 5: A plan view of an electronic key and emergency key, showing a part section FIG. 6: A plan view of an electronic key with a separate actuating element, and FIG. 7: A plan view of an electronic key with an inserted pin-shaped actuating element showing a part section FIG. 1 shows a unit of a device 1 with a receiving device 2 for an electronic key 3 and an integral start/stop switch 4. The receiving device 2 has a spring-loaded cap 5 which closes the receiving device 2 when a key 3 is not inserted, thus preventing the ingress of dirt or moisture. The cap 5 is opened counter to spring force by the insertion of the key 3.

When the key 3 has been inserted and a positive authentication of the electronic key 3 has taken place, the engine can be started by actuating the start/stop button 4, and stopped by actuating it again.

To authenticate the key 3, it contains transmitting and receiving units that exchange one or more codes with the control unit. This device 1 can be integrated at any point in the interior of the vehicle, preferably in the instrument panel.

FIG. 2 shows a sectional view of a schematic of the device 1, with only the locking mechanism being shown in its locked position. The electronic key 3 is inserted into its limit position into the receiving device 2. Sensors (35) indicate to the control unit of the vehicle that the key 3 is in its limit position or functional position, and the control unit then requests the code of the key 3. After positive authentication and actuation of the start/stop button 4, the key 3 is locked in the receiving device 2 against removal, as the engine is starting. A spring element 6 with a shoulder 7 engages in a pocket 8 of the key 3 immediately on insertion of the key. A locking element 9 is then rotated before the spring element 6 by a solenoid (10), so that the spring element 9 can then no longer spring into its second position and the key 3 is prevented from withdrawal by the shoulder 7 projecting into the pocket 8.

The background to the locking process is that the vehicle may not be moved without the key 3 inserted. A release of the key 3 by switching the solenoid 10, activated by the control unit of the vehicle, does not occur until the engine is shut down again. Alternatively, the key 3 can also be released with the vehicle stationery, when the wheels are no longer rotating but the engine is still switched on. This is also registered by the control unit. With the key 3 withdrawn and the engine running, locomotion of the vehicle is barred by the control unit. This avoids incorrect operations due to a removed key 3, and it is furthermore ensured that the vehicle can be operated only with an approved key 3. It is also conceivable to block the key 3 for other operating situations.

FIG. 3 is a schematic of the receiving device 2 in the locked position, showing section B-B. The locking element 9 is mounted so that is can pivot around the articulation axis 11 and is connected to an actuating plate 12 and actuating lever 13 to form a single unit. During normal operation, the locking element 9, 12, 13 is moved by the solenoid 10, when activated by the control unit, from the locked position shown in FIG. 3 to the unlocked position shown in FIG. 4.

The solenoid 10 is a bistable solenoid 10.

In its operating position, the grip/key head 14, 24 of the electronic key 3 projects from the receiving device 2.

FIG. 4 shows the emergency function where in an emergency if the solenoid 10 can no longer be activated by the control unit due to damage or because of power failure, the actuating element 15 has moved the locking element 9 to the unlocking position. Here, the actuating element is pushed by the operator through a recess 16 in the key 3, to push the end 17 of the wire against the actuating plate 12 and move the actuating plate complete with the locking element 9 around the articulation axis 11.

The spring element 6 becomes free and the shoulder 7 can move aside when the key 3 is removed.

The key 3 can be removed from the receiving device 2.

In alternative forms of embodiment (not illustrated), the key 3 is spring loaded in the inserted position, so that when the key 3 is unlocked it is ejected from the receiving device 2 by the spring force.

Figure 5:
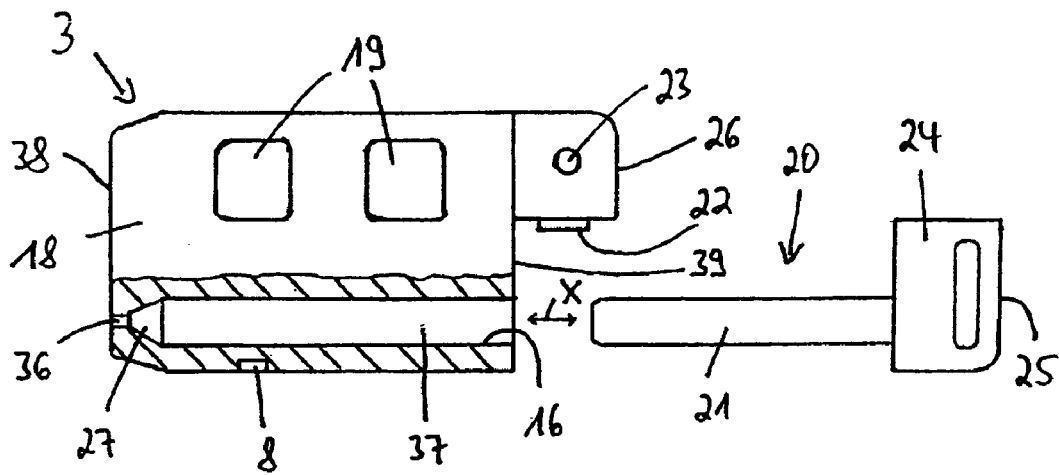

FIG. 5 shows a part section of an electronic key 3. The key 3 has a key housing 18 with integrated switch buttons 19 with which remote control functions can be triggered by radio transmission, e.g. the remote unlocking/locking of vehicle locking systems or opening of windows.

Furthermore, the key 3 has an emergency key 20, the coded key blade 21 of which is inserted into a recess 16 of the electronic key 3. The emergency key is used, in the event of total failure of the control unit, for emergency opening of the vehicle by means of a locking cylinder fitted on the vehicle, thus ensuring access to the vehicle to rectify damage.

In the normal position, the blade 21 of the key is inserted into the recess 16 and locked by means of a catch 22 operated by a button 23 that interacts with the key head 24. The surface 25 of the key head 24 is flush with the surface 26 of the head of the electronic key.

The recess 16 is used to be able to remove the electronic key 3 in the event of failure of the solenoid 10 even when the lock is active. To do this, the emergency key 20 is removed from the lock 3.

Figure 6:
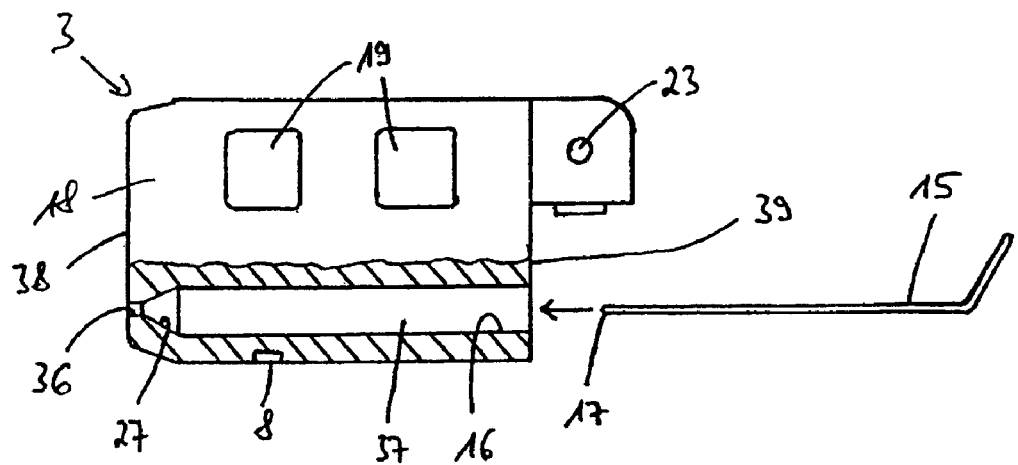

To remove the emergency key 20, the button 23 is pressed and the key 20 is withdrawn at the same time. This makes the recess 16 accessible. A wire-shaped actuating element 15, as shown in FIG. 6, is inserted into the recess 16 in the direction x shown in FIG. 6 and is threaded through a funnel-shaped section 27 into a bore 36 and is thus guided in a central fashion onto the actuating plate 12. The centering ensures that the actuating plate 12 is correctly contacted, particularly when the actuating element 15 has to be passed through intermediate partitions 28 in the housing 29 of the device 1. The wire-shaped element 15 can be kept in the glove compartment of the vehicle. However, it is also possible to use alternative objects such as correctly bent paper clips as actuators.

Figure 7:
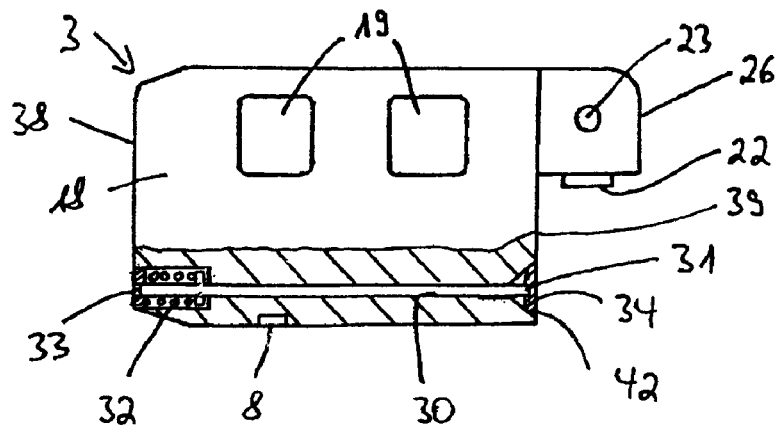

FIG. 7 shows an alternative form of embodiment. In this case, an actuating pin 31 is moveably held in a recess 30 in the electronic key 3. The recess 30 lies parallel to recess 16 used to hold the emergency key 20. The actuating pin 31 is preloaded against the insertion direction of the key 3 into the receiving device 2 by means of spring elements 32. For emergency actuation, the emergency key 20 is removed as described above, in order, using a tool such as a biro or the fingertips, to move the actuating pin 31 in the insertion direction of the key 3 into a depression 34 so that the end 33 of the pin projects from the key housing 29, strikes the actuating plate 12 fitted behind it and moves it to the unlocked position. The electronic key 3 can then be removed from the receiving device 2.

Alternatively, it is possible to protect and cover the recesses 16, 30 against the ingress of dirt by means of separate covers, such as cover 42 shown in FIG. 7 covering an end of recess 30, particularly when there is no emergency key 20 present. The operating surface of the electronic key and/or of the instrument panel can thus be embodied without intrusive elements such as holes.

Furthermore, as an alternative possibility (not illustrated), the locking element 9 can be embodied as a sliding element directly connected to a solenoid 10. A suitable actuating plate 12, on which the actuating element 15 can act in an emergency in order to slide the locking element 9 into the unlocked position, is flange-mounted on the sliding element or combined with it to form a single unit.

The invention claimed is:

1. A device for starting an engine of a vehicle by means of an electronic key, which may also be in the check card format, said device comprising:
   a receiving device in the vehicle for inserting the electronic key, with the electronic key, when inserted in the receiving device, being unable to be rotated and being moveable in a longitudinal direction into at least one defined raised position;
   a sensor of a control unit monitoring the electronic key in the raised position to control at least one function of the engine;
   a locking element controlled by an electric drive securing the electronic key in the specific raised position against removal from the receiving device; and
   means enabling removal of the electronic key in the event of failure of the electric drive, wherein the means enabling removal of the electronic key includes an actuation element extending completely through said electronic key in the direction of key insertion to disengage said locking element from said electronic key and enable removal of said electronic key from said device in the event of failure of the electric drive.

2. The device according to claim 1, wherein the locking element controlled by the electric drive has a lever and/or actuating surfaces, and the means enabling removal of the electronic key includes an actuating element which moves in a recess in the electronic key and acts on the lever and/or actuating surfaces, so that the locking element can be moved manually to an unlocking position by means of this actuating element.

3. The device according to claim 1 wherein a start/stop button forms a unit together with the receiving device for the electronic key.

4. The device according to claim 1, wherein the electronic key inserted into the receiving device can be moved longitudinally between two axially offset raised positions, with the different raised positions of the electronic key being monitored by the sensor of the control unit to control at least one function of the engine or of the vehicle.

5. The device according to claim 2, wherein the actuating element is a wire-shaped part.

6. The electronic key for use in a device according to claim 1, wherein the electronic key has a continuous recess in the direction of insertion for guiding through or receiving the actuating element.

7. The electronic key according to claim 6, wherein the recess leads in a funnel shape into a bore so that the actuating element can be guided centrally through the bore in order to actuate the locking element into the unlocking position.

8. The electronic key according to claim 6, wherein the recess or an actuating pin is covered when a key head of an emergency key is in the normal position and the emergency key has to be removed from the electronic key for actuation.

9. The electronic key according to claim 6, wherein the recess for guiding through the actuating element in the electronic key is covered on the surface opposite the insertion side.

10. A device for starting an engine of a vehicle by means of an electronic key, which may also be in the check card format, said device comprising:
    a receiving device in the vehicle for inserting the electronic key, with the electronic key, when inserted in the receiving device, being unable to be rotated and being moveable in a longitudinal direction into at least one defined raised position;
    a sensor of a control unit monitoring the electronic key in the raised position to control at least one functions of the engine;
    a locking element controlled by an electric drive securing the electronic key in the specific raised position against removal from the receiving device; and
    means enabling removal of the electronic key in the event of failure of the electric drive, wherein the electric drive controlling the key locking element is selected from the group consisting of a solenoid and an electric motor.

11. An electronic key for use in a device for starting an engine of a vehicle by means of an electronic key, which may also be in the check card format, said device comprising:
    a receiving device in the vehicle for inserting the electronic key, with the electronic key, when inserted in the receiving device, being unable to be rotated and being moveable in a longitudinal direction into at least one defined raised position;
    a sensor of a control unit monitoring the electronic key in the raised position to control at least one functions of the engine;
    a locking element controlled by an electric drive securing the electronic key in the specific raised position against removal from the receiving device; and
    means enabling removal of the electronic key in the event of failure of the electric drive, wherein the electronic key has a continuous recess in the direction of insertion for guiding through or receiving an actuating element and, wherein the recess is formed from the receiving slot of an emergency key.

12. An electronic key for use in a device for starting an engine of a vehicle by means of an electronic key, which may also be in the check card format, said device comprising:
    a receiving device in the vehicle for inserting the electronic key, with the electronic key, when inserted in the receiving device, being unable to be rotated and being moveable in a longitudinal direction into at least one defined raised position:
    a sensor of a control unit monitoring the electronic key in the raised position to control at least one functions of the engine;

a locking element controlled by an electric drive securing the electronic key in the specific raised position against removal from the receiving device; and means enabling removal of the electronic key in the event of failure of the electric drive, wherein the electronic key has a continuous recess in the direction of insertion for guiding through or receiving an actuating element and, wherein the actuating element is an actuating pin supported in the recess and spring loaded counter to the direction of insertion of the electronic key, wherein in an unactuated position the actuating pin does not project beyond the insertion side of the key housing and when actuated from the insertion side of an emergency key, the actuating pin projects from an opposite surface of the key housing and moves the locking element to an unlocking position.

* * * * *